Figure 1:
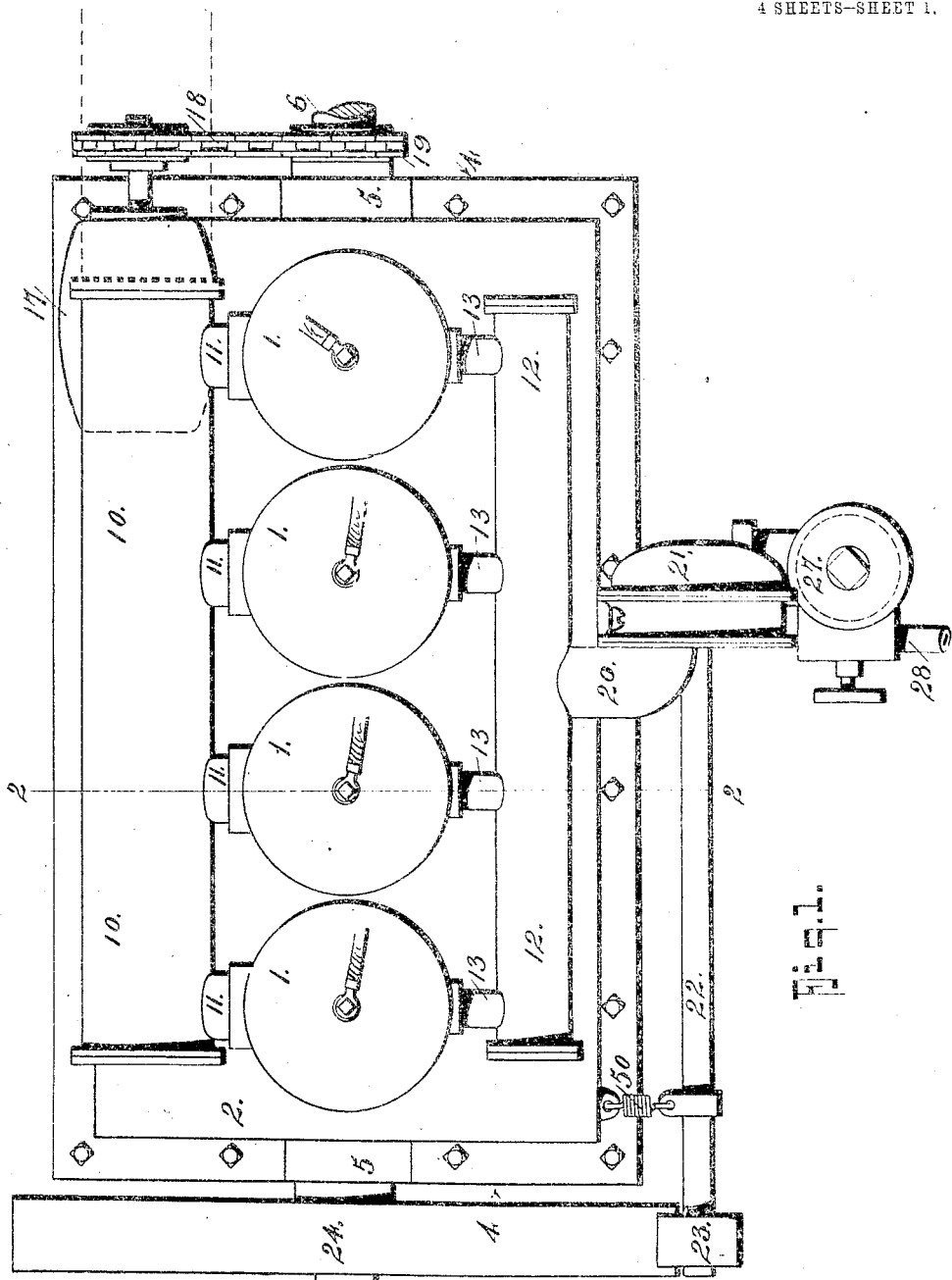

C. A. McKIEARNAN.
TWO CYCLE INTERNAL COMBUSTION ENGINE AND METHOD OF OPERATING ENGINES OF THIS TYPE.
APPLICATION FILED AUG. 10, 1911.
1,097,725.
Patented May 26, 1914.
4 SHEETS—SHEET 2
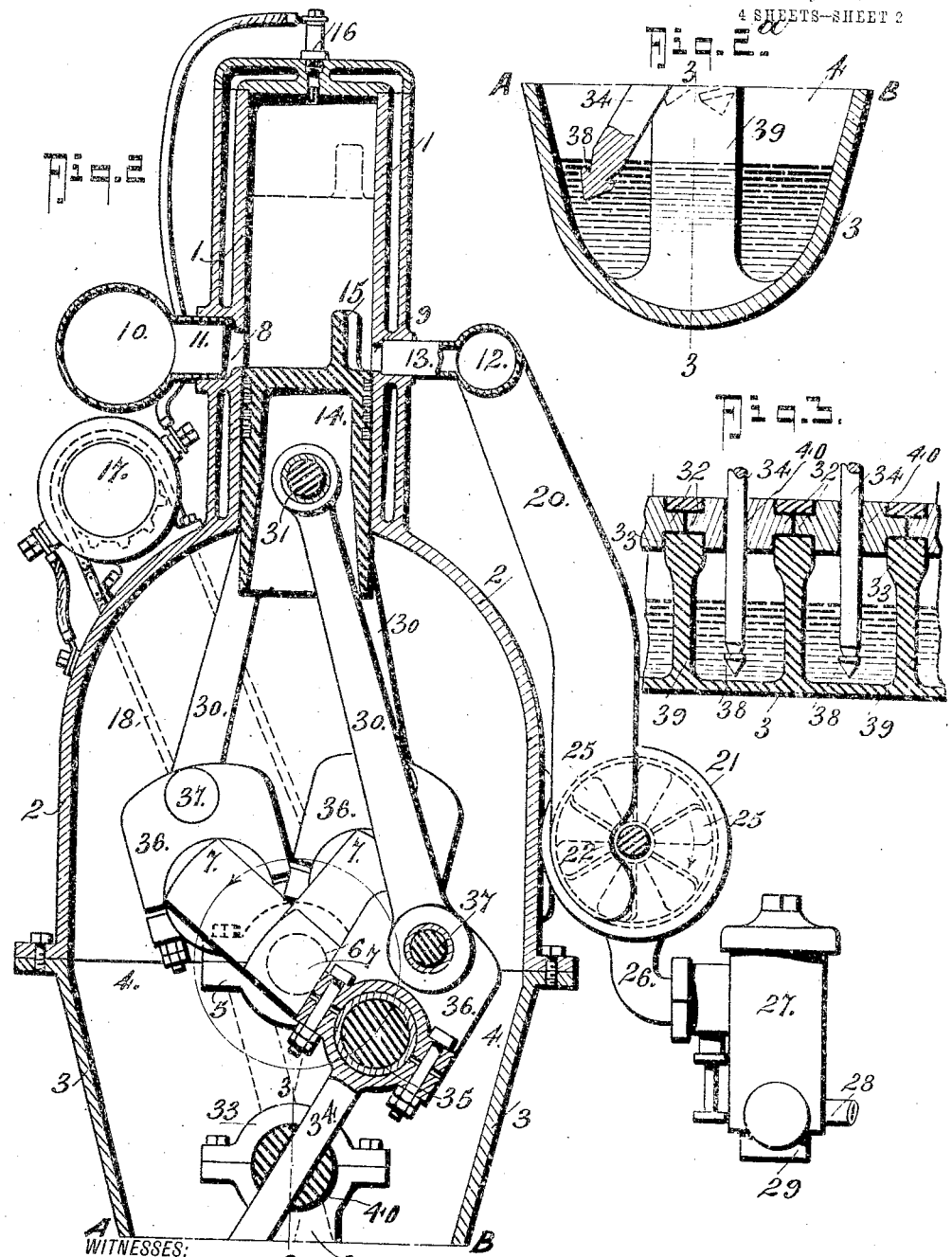
WITNESSES:
John G. Schrott
Hayward Woodard
INVENTOR
Charles H. McKiernan
BY
Fred G. Dieterich Co.
ATTORNEYS

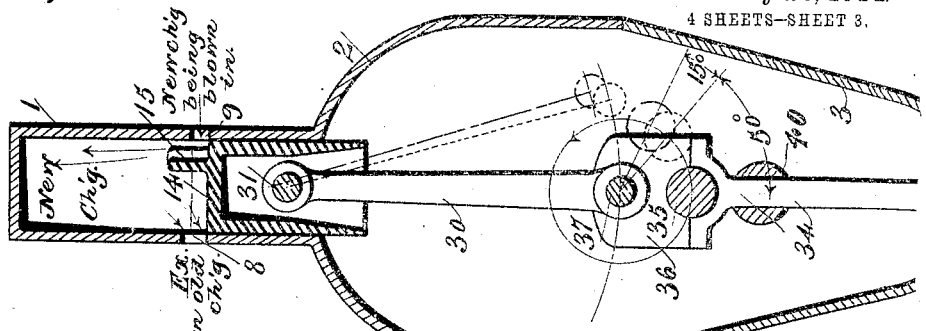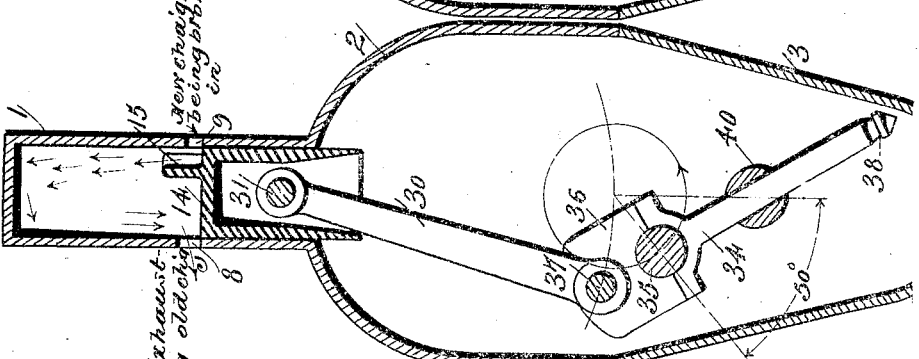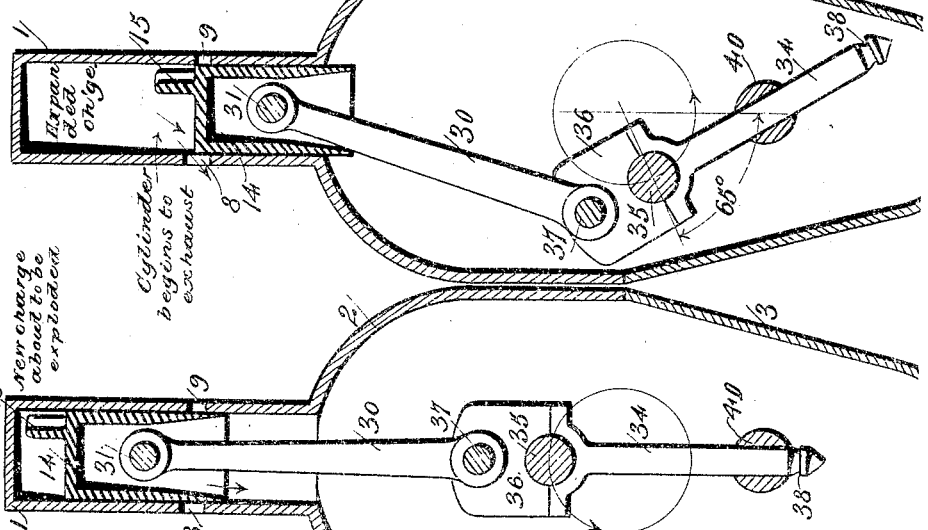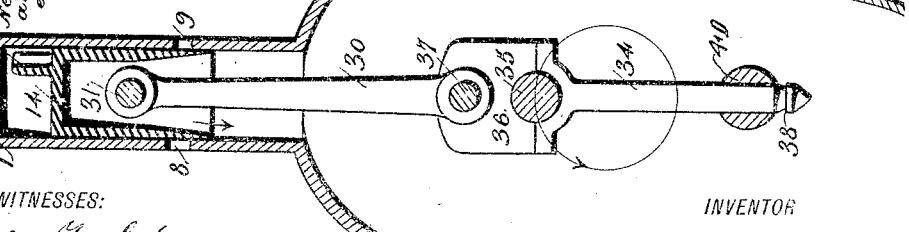

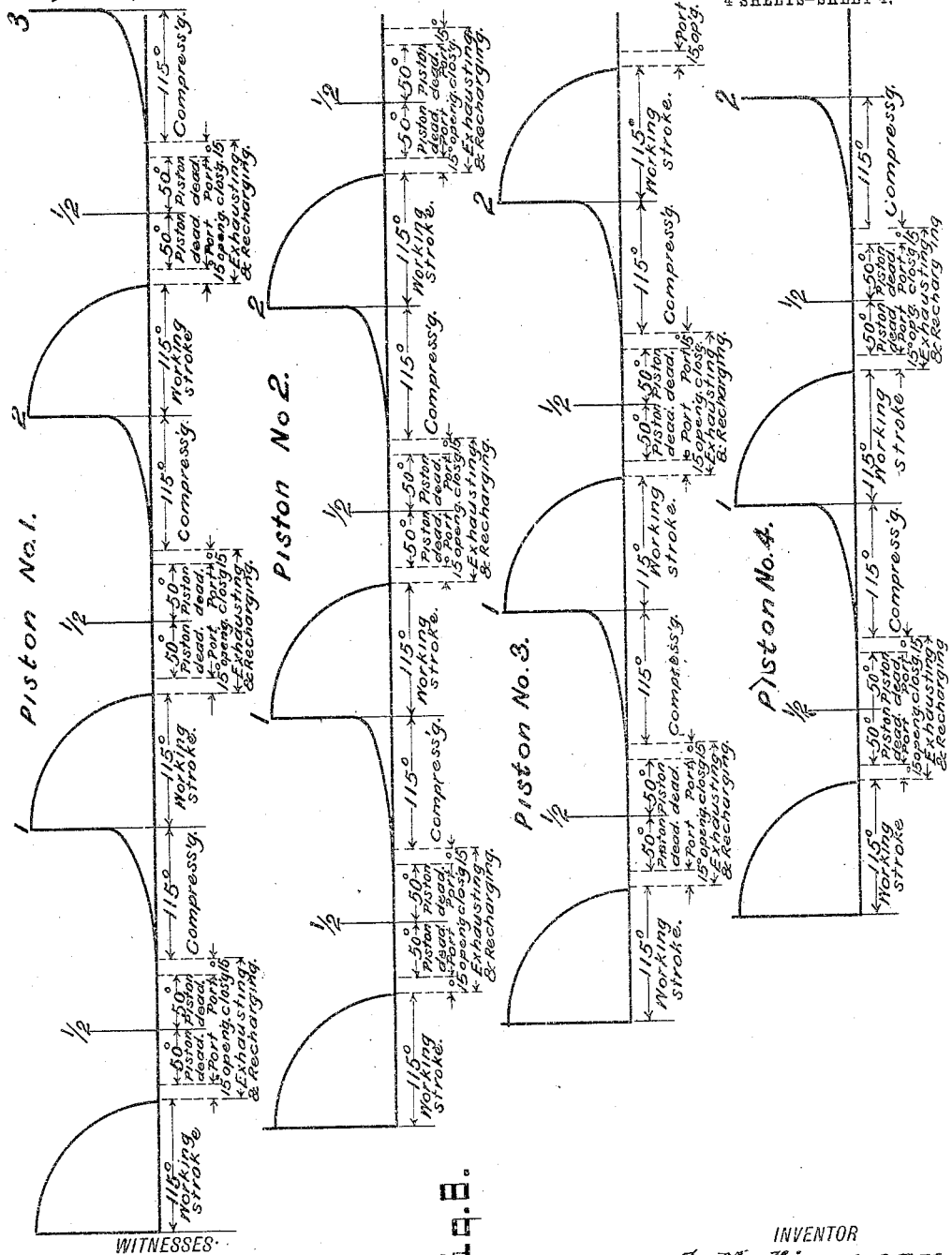

UNITED STATES PATENT OFFICE.

CHARLES A. McKIEARNAN, OF WICHITA FALLS, TEXAS.

TWO-CYCLE INTERNAL-COMBUSTION ENGINE AND METHOD OF OPERATING ENGINES OF THIS TYPE.

1,097,725.        Specification of Letters Patent.       Patented May 26, 1914.

Application filed August 10, 1911. Serial No. 643,283.

*To all whom it may concern:*

Be it known that I, CHARLES A. McKIEARNAN, residing at Wichita Falls, in the county of Wichita, and State of Texas, have invented certain new and useful Improvements in Two-Cycle Internal-Combustion Engines and Methods of Operating Engines of this Type, of which the following is a specification.

My invention is an internal combustion engine of the two port, two-cycle type, and it is particularly designed and adapted for use on motor vehicles, motor boats, flying machines and the like.

It is practically conceded by those familiar with the practical use of internal combustion engines for automobiles and the like, that a two-cycle engine is preferable to other types, provided such engine have adequate provision for an effective scavenging of the cylinder or cylinders after each explosive impulse. In the engines of the type stated, that have come into use at the present time, the piston is continuously in motion in one direction or the other, except for an instantaneous stop at the ends of its stroke when the direction of movement of the piston is changing. The piston controls the exhaust and inlet ports to open the same when the piston is near its lower limit of stroke, and the time in which the exhaust port is held open is usually comparatively slight, seldom more than the time it takes the crank to move through an arc of about 30°. In this time the old charge must pass through the exhaust port and be replaced by the new charge. It will be seen that the faster the engine is running, the shorter the interval of time in which the exhausting act and the recharge act, can occur.

Again, in the common type of two-cycle engines, and particularly those of the so called crank case compression type, the new charge enters the cylinder at a maximum pressure, which then drops practically to zero by the time the inlet port is fully uncovered and thereafter does not exert any material tendency to blow out the old charge residue, with the result that (particularly when the engine is of the high speed type) some of the old charge remains in the cylinder to foul the new charge and sometimes causes premature ignition thereof. It is therefore the object of my invention to provide an engine of this type in which the piston uncovers the exhaust and inlet ports, then remains inactive, "dead," for a relatively long period of time, before the exhaust and inlet ports are recovered by the piston; the movement of the piston on its compressing and working strokes, while the exhaust and inlet ports are closed, is comparatively rapid to regain the time lost while the piston remains inactive during the period when the ports are uncovered, thus maintaining the same crank shaft speed as in engines of the ordinary type.

Another object of my invention is to provide means for blowing in a new charge to displace the old one, at a substantially constant pressure if desired, during the whole time the inlet port is opened, thereby insuring a full and complete scavenging of the cylinder and the admission of a complete new charge in lieu of the old one.

In carrying out my invention, I provide a cylinder of the usual two port construction, a piston, and a crank shaft also of the ordinary type. I connect the piston to the crank shaft by a special mechanism which also forms a part of my invention, and that will cause the piston to travel rapidly up and down during the particular time in which the cylinder ports remain closed; the piston, when ports have been uncovered, remaining stationary, "dead", during the time the crank shaft is turning through about one-third, more or less, of a revolution, thus giving ample time for the old charge to be blown out and the new charge blown in. The latter act is accomplished by a fan or blower which sucks the mixture from the carbureter and blows it into the cylinder.

The invention also embodies an improved means for effecting the required lubrication of the parts inclosed in the crank case.

The invention also resides in providing an improved method of operating internal combustion engines of the two cycle piston controlled type.

These novel details of construction, combination and arrangements of parts, hereinafter described, also form a part of my invention.

Figure 1 is a top plan view of a four-cylinder engine embodying the invention; Figs. 2—2ª are a cross section on the line 2—2 of Fig. 1; Figs. 2 and 2ª being taken as one by joining the lines A—B; Fig. 3 is a detail section on the line 3—3 of Fig. 2. Figs. 4 to 7 inclusive are diagrammatic views showing different positions of the parts of one cylinder at different intervals in its cycle of operation. Fig. 8 is a diagrammatic view illustrating the cycles of operation of the respective cylinders of a four-cylinder engine.

Referring now to the accompanying drawings in which like numerals and letters of reference indicate like parts in all of the figures, 1 is the working cylinder which may be suitably water-jacketed and may in general be of the ordinary construction.

2 is the upper section of the crank case which may be cast integrally with the cylinders if desired, and 3 is the lower section of the crank case.

4 designates webs, formed with the lower section of the crank case, and having bearing portions 5 to receive the crank shaft 6, which has cranks 7 for the various pistons. In an engine of the four cylinder type, there would of course be four cranks 7, which would be preferably set on quarters.

8 designates the exhaust port which is piston controlled as is also the inlet port 9. The exhaust ports 8 of the various cylinders lead into the lateral ducts 11 that deliver into the exhaust offtake duct 10, while the inlet ports 9 connect with the intake duct 12 through the lateral ducts 13.

14 designates the pistons which are of the usual type and have the baffles 15 for deflecting the incoming gases toward the cylinder head.

16 designates the spark plugs, and 17 designates the magneto which is driven from the crank shaft 6 by sprocket and chain connections 18 and 19.

21 is the blower or fan case in which a set of fan blades 25 is mounted, the fan blades 25 being driven by a shaft 22 that receives its motion from the fly wheel 24 through a friction pulley 23, that is held in contact with the fly wheel 24, by a spring device 50. The blower case 21 has its intake 26 joined to the carbureter 27, which carbureter may be of any approved type and is provided with the usual inlet duct 29 for the air, and inlet duct 28 for the gasolene.

The fan 25 sucks the mixture from the carbureter 27 through the pipe 26 and blows it through the duct 20 into the duct 12 and through the ducts 13 into the respective cylinders 1 when the ports 9 are opened.

30 designates connecting rods, which are pivoted, at 31, to the respective pistons and which, in my invention, do not connect directly with the crank 7 of the crank shaft 6, but are pivoted, at 37, to what I term, for convenience, an auxiliary connecting member 36 which has a bearing 35 to receive the respective crank 7, and which is provided with a rod 34 that passes through a rocking or oscillating bearing 40 whose trunnions 32 are held in bearings 33 in the standards 39. The lower ends of the rods 34 are pointed and cupped as at 38 to form oil flingers, and these ends dip into the oil contained in the bottom of the crank case section 3, the standards 39 being spaced from the walls, to allow an even level of oil throughout the crank case.

Operation: So far as desired, the manner in which my invention operates will be best explained as follows:—Assume the parts to be positioned as indicated in Fig. 4, with a new charge ahead of the piston 14, under compression, and just about to be fired. The new charge is now fired, thereby impelling the piston 14 downwardly on its working stroke and turning the crank shaft in the direction of the arrow in Fig. 4. As soon as the piston has traveled from the position shown in Fig. 4 to the position shown in Fig. 5, the exhaust port 8 will begin to open and the exhausting act commence. A further movement of the piston from the position shown in Fig. 5 to the position shown in Fig. 6, causes both the exhaust port 8 and the inlet port 9 to be opened and the piston 14 has reached the lowermost limit of its movement. As soon as the port 9 begins to open, as the piston 14 passes from the position shown in Fig. 5, to that shown in Fig. 6, the old charge will be displaced by the new charge that is blown into the cylinder 1 by the fan 21 under constant pressure. It will be observed, that when the piston has reached the lowermost limit of its stroke as shown in Fig. 6, the crank 7 still has about 50°, more or less, of movement before it arrives at the lowermost limit of its movement. During this interval (the time elapsing while the crank 7 is moving from the position shown in Fig. 6 to that shown in full lines in Fig. 7) the piston 14 will remain stationary or "dead" and the act of exhausting and recharging will continue. The crank 7 now moves from the position shown in full lines in Fig. 7 to that shown in dotted lines in the same figure, or in other words, to a position 50°, more or less, from the position shown in full lines in Fig. 7. During this movement, the piston 14 will remain dead and the act of exhausting and recharging will continue. Thus, it will be observed, that during 100° more or less, (the movement of the crank from the position shown in full lines in Fig. 6 to that shown in dotted lines in Fig. 7) the piston 14 becomes wholly inactive. Now as the crank 7 moves from the dotted line position of Fig. 7 to the dot and dash line position in the same figure, it will move the piston upwardly on its compression stroke, closing the inlet port and immediately subsequently closing the exhaust port 8. During the time the piston moves from the dot and dash line position shown in Fig. 7, back to the position shown in Fig. 1, it will compress the new charge and complete its cycle of movement.

In Fig. 8 I have graphically disclosed the cycle of movement of the four pistons commencing with a compressed charge in the cylinder for piston number 1. As the piston moves downwardly it completes its working function during the first 115°, more or less, of the movement of the crank shaft and during the next 15° of movement of the crank shaft, the working stroke of the piston is fully completed and the exhaust and inlet ports are fully opened. At this time the crank shaft has turned through approximately 130° from the position shown in Fig. 1 to the position shown in Fig. 6. During the next 100° of movement of the crank shaft, i. e. 50° down and 50° up, the piston remains "dead" or stationary, (see diagram Fig. 8), after which it begins its upward movement to first close the ports and then compress the new mixture, thus completing its cycle of operation which is repeated *ad infinitum.*

It will also be noted that the faster the engine is running, the greater the speed of the blower 25 and consequently the higher the pressure in the duct 12. As the speed increases also, the interval of time the ports remain open is proportionately shorter, but as the pressure in the duct 12 increases proportionately to the decrease in time during which the ports are opened, the pressure-time factor remains constant regardless of the speed, so that a complete scavenging and recharging of the cylinder is insured at all times.

I also wish to call attention to the fact, that by my construction, the piston 14 moves from one end of its stroke to the other in a vastly shorter interval of time during a crank shaft revolution than in any other two-cycle engine with which I am familiar, thus giving a greater period of rest during which the scavenging and recharging operations can take place, and also by reason of the fact that the entire working impulse exerts its force during the first 115°, more or less, of downward movement of the crank, the mean position of power application to the crank shaft is nearer the beginning of its downward movement than in the ordinary type of engine, thus giving more power to the crank shaft, at the time it is most needed.

In practice, the upper ends of the cylinders will be oiled by mixing lubricating oil with the gasolene, or any other system of lubrication may be employed.

From the foregoing description taken in connection with the accompanying drawings, it is thought the complete construction, operation and advantages of the invention will be clearly apparent to those skilled in the art to which it appertains.

What I claim is:

1. In an internal combustion engine, a cylinder, a piston operating therein, a continuously rotatable crank shaft and connections between said piston and crank shaft for imparting intermittent reciprocation to said piston, together with ports for admitting and exhausting charges into and from said cylinder, said connections including means for causing said piston to be held stationary during a predetermined time after the ports are opened by the piston.

2. In an internal combustion engine, a cylinder having piston controlled inlet and exhaust ports, a piston operating in said cylinder, a continuously movable crank shaft, connections between said piston and said crank shaft for transmitting the movements of the piston to the crank shaft, said connections including means for holding said piston stationary during a predetermined interval while the engine is exhausting and recharging.

3. In an internal combustion engine, a cylinder having piston controlled inlet and exhaust ports, a piston operating in said cylinder, a crank shaft, operative connections between said crank shaft and said piston and including means for holding said piston stationary during a predetermined time while said ports are open.

4. In an internal combustion engine, a cylinder having piston controlled inlet and exhaust ports, a piston operating in said cylinder, a crank shaft, operative connections between said crank shaft and said piston, and including means for holding said piston stationary during a predetermined interval of time while said ports remain open, and means for blowing a new charge into said cylinder through said inlet port to displace the exhaust charge.

5. In an internal combustion engine, a cylinder having piston controlled inlet and exhaust ports, a piston operating in said cylinder, a crank shaft, operative connections between said crank shaft and said piston and including means for holding said piston stationary during a predetermined time while said ports are open, and means for forcing a new charge into said cylinder at a constant pressure during the time said inlet port is open to displace the old charge and recharge the cylinder.

6. In an internal combustion engine, a cylinder having piston controlled inlet and exhaust ports, a piston operating in said cylinder, a crank shaft, operative connections between said crank shaft and said piston and including means for holding said piston stationary during a predetermined interval of time while said ports are open, means for forcing a new charge into said cylinder at a constant pressure during the time said inlet port is open to displace the old charge and recharge the cylinder, and for varying the pressure at which the new charge is forced in, proportionately to the speed of operation of the crank shaft.

7. In a two cycle internal combustion engine, a cylinder having a piston controlled exhaust port and a piston controlled inlet port, a piston operating in said cylinder, a crank shaft, connections between said piston and said crank shaft, a blower for blowing the charge into the cylinder when said inlet port is open and simultaneously displacing the exhaust charge, said connections between said pistons and said crank shaft including a connecting rod connected to the piston, an auxiliary connecting member pivoted to said connecting rod and to the crank of the crank shaft, and an oscillating guide for said auxiliary connecting member to cause said piston to remain stationary when said ports are uncovered and for a definite length of time.

8. In an internal combustion engine, a set of cylinders, each having piston controlled inlet and exhaust ports, a set of pistons, a common crank shaft, a crank case having bearings for said crank shaft, said crank shaft including a crank for each piston, a connecting rod pivoted to each piston, an auxiliary connecting member pivoted to the connecting rod and to each crank, a guide for each auxiliary connecting member, said crank shaft, said auxiliary connecting members and said connecting rods being arranged to cause said pistons to remain immovable when the respective ports are open and for a predetermined length of time, a common charging mechanism for forcing a charge into the respective cylinders at substantially constant pressure during the time the cylinder ports are open, substantially as shown and described.

9. In an internal combustion engine, a set of cylinders, each having piston controlled inlet and exhaust ports, a set of pistons, a common crank shaft, a crank case having bearings for said crank shaft, said crank shaft including a crank for each piston, a connecting rod pivoted to each piston, an auxiliary connecting member pivoted to the connecting rod and to each crank, a guide for each auxiliary connecting member, said crank shaft, said auxiliary connecting members and said connecting rods being arranged to cause said pistons to remain immovable when the respective ports are open and for a predetermined length of time, a common charging mechanism for forcing a charge into the respective cylinders at substantially constant pressure during the time the cylinder ports are open, and for varying the applied charge pressure proportionately to the speed of operation of the engine.

10. In an internal combustion engine, a set of cylinders, each having piston controlled inlet and exhaust ports, a set of pistons, a common crank shaft, a crank case having bearings for said crank shaft, said crank shaft including a crank for each piston, a connecting rod pivoted to each piston, an auxiliary connecting member pivoted to the connecting rod and to each crank, a guide for each auxiliary connecting member, said crank shaft, said auxiliary connecting members and said connecting rods being arranged to cause said pistons to remain immovable when the respective ports are open and for a predetermined length of time, a common charging mechanism for forcing a charge into the respective cylinders at substantially constant pressure during the time the cylinder ports are open, said auxiliary connecting members each including a rod portion terminating in a cupped oil flinging end, the bottom of said crank case serving as an oil reservoir to supply oil to said cupped shaped ends in virtue of which said cupped shaped oil flinging ends will fling the oil through the crank case to lubricate the members therein.

11. The method of operating two-cycle internal combustion engines which have cylinders and pistons and piston controlled inlet and exhaust ports, said method consisting in holding the piston stationary for a comparatively long interval of time while the ports are open, blowing a new charge into the cylinder through the inlet port and simultaneously displacing the exhausted charge while said ports are held open and quickly moving said piston to close said ports and compress the new charge; subsequently igniting said charge to impel said piston on a working stroke, and then again uncovering said ports, substantially as specified.

12. The method of operating a two-cycle internal combustion engine which has a cylinder, a piston and piston controlled exhaust ports, said method consisting in holding the piston stationary for a comparatively long interval of time when said exhaust port has been opened, placing a new charge in the cylinder to displace the old charge through the exhaust port, then quickly moving said piston to close said exhaust port and subsequently compress the new charge, then igniting the compressed charge to impel the piston on its working stroke, substantially as specified.

13. The method of operating a two-cycle internal combustion engine which has a cylinder, a piston an exhaust port and an inlet port, said method consisting in holding the piston stationary for a comparatively long interval of time at the end of its working stroke, putting a new charge into the cylinder and exhausting the old charge therefrom while the piston remains stationary, then quickly closing said ports and quickly moving said piston to compress the new charge, and subsequently igniting the new charge to impel said piston on its working stroke, substantially as specified.

14. In an internal combustion engine, a cylinder having piston controlled inlet and exhaust ports, a piston operating in said cylinder, a crank shaft, operative connections between said crank shaft and said piston, and including means for holding said piston immovable during a predetermined interval of time while said ports are open.

CHARLES A. McKIEARNAN.

Witnesses:
L. C. GIBSON,
D. C. SMITH.